United States Patent
Ito

(10) Patent No.: US 8,872,028 B2
(45) Date of Patent: Oct. 28, 2014

(54) BRAIDED WIRE PROCESSING METHOD AND RING MEMBERS

(75) Inventor: Naoki Ito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 160 days.

(21) Appl. No.: 13/701,553

(22) PCT Filed: May 31, 2011

(86) PCT No.: PCT/JP2011/062522
§ 371 (c)(1),
(2), (4) Date: Dec. 3, 2012

(87) PCT Pub. No.: WO2011/152415
PCT Pub. Date: Dec. 8, 2011

(65) Prior Publication Data
US 2013/0068524 A1    Mar. 21, 2013

(30) Foreign Application Priority Data
Jun. 4, 2010 (JP) ................... 2010-128466

(51) Int. Cl.
*H02G 15/02* (2006.01)
*H02G 15/08* (2006.01)
*H01R 4/00* (2006.01)
*H02G 3/06* (2006.01)
*H01R 43/00* (2006.01)
*H01R 9/05* (2006.01)
*H01R 13/655* (2006.01)
*H01R 43/26* (2006.01)

(52) U.S. Cl.
CPC ............. *H02G 15/08* (2013.01); *H01R 9/0512* (2013.01); *H01R 9/0518* (2013.01); *H01R 13/655* (2013.01); *H01R 43/26* (2013.01)
USPC ............. 174/78; 174/88 R; 174/88 C; 29/869

(58) Field of Classification Search
USPC .......................... 174/21 R–29 R, 74 R–84 S, 174/102 R–124 GC, 15.1–15.3, 32–36, 174/126.1–133 B
See application file for complete search history.

(56) References Cited

U.S. PATENT DOCUMENTS 5,666,452 A * 9/1997 Deitz et al. .................... 385/100
5,962,812 A * 10/1999 Miyazaki ........................ 174/78

(Continued)

FOREIGN PATENT DOCUMENTS

CN    2869899 Y    2/2007
JP    11273757 A   10/1999

(Continued)

OTHER PUBLICATIONS

International Search Report (PCT/ISA/210) dated Jul. 12, 2011 issued by the International Searching Authority in counterpart International Application No. PCT/JP2011/062522.

(Continued)

*Primary Examiner* — Tuan T Dinh
*Assistant Examiner* — Ahmad D Barnes
(74) *Attorney, Agent, or Firm* — Sughrue Mion, PLLC

(57) ABSTRACT

Disclosed is a braided wire processing method. An operation is carried out wherein a braided wire is folded over with an end portion of a first ring member, forming a braided wire fold over portion; and the outer circumference portion and a cutout portion of the first ring member, as well as a conductor of a grounding line, are covered with the braided wire fold over part. Next, an operation is carried out wherein the exterior side of the braided wire fold over portion passes through a second ring member from the wire axial direction. As the second ring member passes thereupon, the second ring member compresses the first ring member in the circumferential direction thereof. The gap of the cutout part of the first ring member is thus contracted, and the conductor that projects therein is clasped.

4 Claims, 7 Drawing Sheets

(56) References Cited

U.S. PATENT DOCUMENTS

| | | | |
|---|---|---|---|
| 6,291,771 | B1 | 9/2001 | Tanikawa et al. |
| 2003/0236562 | A1 | 12/2003 | Kuzma |

FOREIGN PATENT DOCUMENTS

| | | | |
|---|---|---|---|
| JP | 2000166074 | A | 6/2000 |
| JP | 2001286025 | A | 10/2001 |
| JP | 2007-005154 | A | 1/2007 |
| KR | 10-0944933 | B1 | 3/2010 |

OTHER PUBLICATIONS

The Written Opinion (PCT/ISA/237) of the International Searching Authority dated Jul. 12, 2011 issued in counterpart International Application No. PCT/JP2011/062522.

Notice of Allowance dated Dec. 17, 2013, issued by the Korean Intellectual Property Office in counterpart Korean Application No. 10-2012-7031804.

Office Action dated Jul. 25, 2014 issued by the State Intellectual Property Office of the People's Republic of China in counterpart Chinese Patent Application No. 201180027680.0.

\* cited by examiner

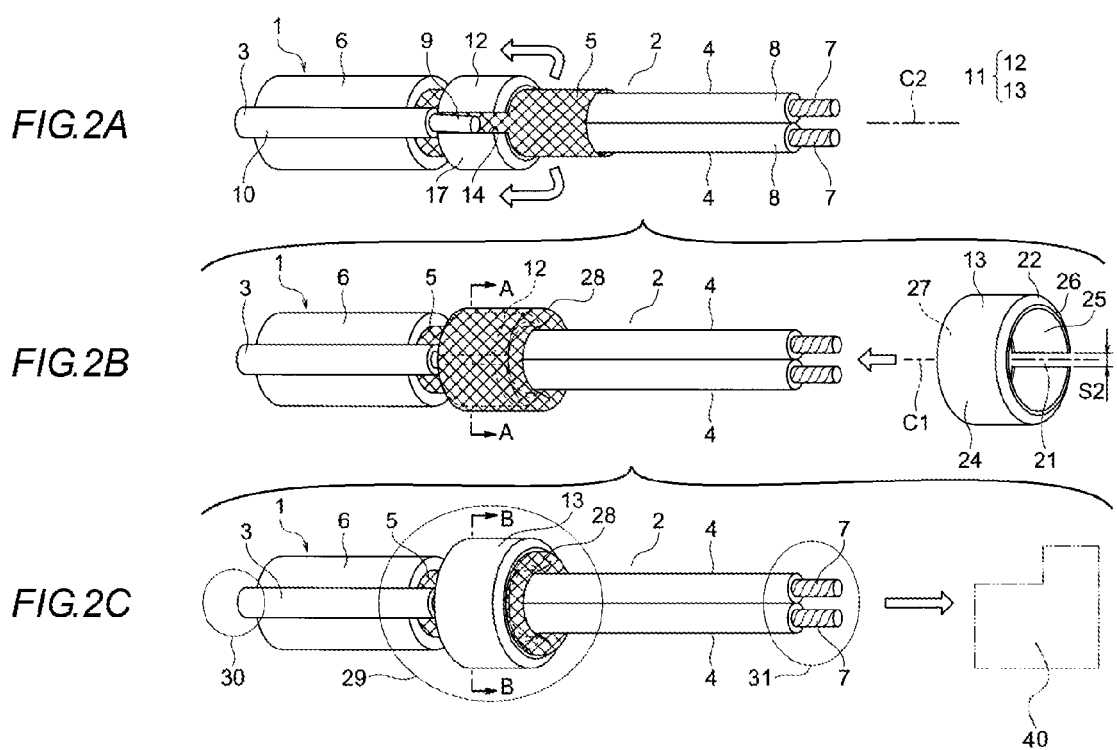

BRAIDED WIRE PROCESSING METHOD AND RING MEMBERS

TECHNICAL FIELD

The invention relates to a braided wire processing method of connecting a grounding wire to a braided wire of a shielded electric wire and ring members that are used to connect the grounding wire to the braided wire.

BACKGROUND ART

Patent Document 1 discloses a connector in which a terminal portion of a shielded electric wire and a grounding wire connected to a braided wire of the shielded electric wire are accommodated in a housing. The grounding wire is connected to the braided wire of the shielded electric wire by ultrasonic vibration.

The method, other than the above method of connecting the grounding wire to the braided wire of the shielded electric wire by the ultrasonic vibration, includes a following braided wire processing method. Specifically, as shown in FIG. 6A, an operation is carried out wherein an insulator 103 of a terminal portion 102 of a shielded electric wire 101 is stripped to expose a braided wire 104 by a predetermined length.

Then, as shown in FIG. 6B, an operation is carried out wherein a stitch of the braided wire 104 adjacent to a terminal of the insulator 103 is widened and signal lines 105, 105 are pulled out from the widened stitch. Subsequently, after the signal lines 105, 105 are pulled out, an operation is carried out wherein the braided wire 104 is combined to form a linear portion 106. Subsequently, an operation is carried out wherein insulators 108, 108 of terminal portions 107, 107 of the signal lines 105, 105 are stripped to expose conductors 109, 109 by predetermined lengths.

Subsequently, as shown in FIG. 6C, an operation is carried out wherein the linear portion 106 passes through an insulation tube 111 so that a terminal crimping portion 110 is formed at a terminal of the linear portion 106. Then, an operation is carried out wherein a tape is wound at a position of a circle 112 including a terminal position of the insulator 103 and crimping terminals (not shown) are respectively crimped at the conductors 109, 109 and the terminal crimping portion 110.

Lastly, when an operation is carried out wherein a portion shown with a circle 113 becoming portions of crimping terminals (not shown) is accommodated and fixed in a well-known connector housing 200, a series of operation processes including the braided wire processing are completed.

In the above braided wire processing method, the stitch of the braided wire 104 is widened to pull out the signal lines 105, 105, in which operation many processes are required. Thus, a braided wire processing method disclosed in Patent Document 2 may be adopted so as to reduce the number of operation processes. In the below, the braided wire processing method disclosed in Patent Document 2 is described.

In FIG. 7A, an operation is carried out wherein an insulator 123 of a terminal portion 122 of a shielded electric wire 121 is stripped to expose a braided wire 124 by a predetermined length.

Then, as shown in FIG. 7B, an operation is carried out wherein an exterior side of the braided wire 124 passes through a support ring 125 having high mechanical strength. Subsequently, an operation is carried out wherein the braided wire 124 is folded back to form a braided wire folding back portion 126. Then, an operation is carried out wherein a conductor 128 of a grounding wire 127 is brought into contact with the braided wire folding back portion 126 from an exterior side of the braided wire folding back portion 126.

Subsequently, as shown in FIG. 7C, an operation is carried out wherein exterior sides of the braided wire folding back portion 126 and the conductor 128 contacting the same are passed through a deformable copper ring 129 having conductivity. Then, an operation is carried out wherein a centrally-directed pressure is applied to an outer circumference portion of the copper ring 129 to thus crimp the braided wire folding back portion 126 and the conductor 128 between the support ring 125 and the copper ring 129.

Subsequently, as shown in FIG. 7D, an operation is carried out wherein an exterior side of the copper ring 129 passes through an insulating thermal shrinking tube 130 and the thermal shrinking tube 130 is then heated and shrunken.

Lastly, when an operation is carried out wherein a crimping terminal (not shown) is crimped and a part of the crimping terminal is accommodated and fixed in a connector housing (not shown), a series of operations processes including the braided wire processing are completed.

PRIOR ART DOCUMENT

Patent Documents

Patent Document 1: JP-A-11-273757
Patent Document 2: JP-A-2001-286025

SUMMARY OF INVENTION

Problems to Be Solved by Invention

According to the technology disclosed in Patent Document 2, the centrally-directed pressure is applied to the outer circumference portion of the copper ring 129, so that it is possible to bring the conductor 128 of the grounding wire 127 into contact with the braided wire folding back portion 126 and to retain the copper ring 129. However, since the copper ring 129 is retained at the contact part of the conductor 128, the contact and the retentivity are influenced each other. That is, it is not possible to ensure sufficient stability as regards contact and retentivity.

In addition, according to the above technology, the exterior sides of the braided wire folding back portion 126 and the conductor 128 contacting the same are passed through the copper ring 129. Therefore, if an operator does not pay attention to the insertion of the copper ring 129, the copper ring 129 may be caught at the conductor 128. In this case, the conductor 128 may be forcibly pushed out from the braided wire folding back portion 126. Also, a diameter of the copper ring 129 may be increased so that the copper ring is not caught at the conductor 128. However, until a next operation, i.e., until the pressure is applied to the copper ring 129, the grounding wire may fall away.

The invention has been made to solve the above problems. An object of the invention is to provide a braided wire processing method capable of ensuring sufficient stability as regards contact with a conductor in a grounding wire and retentivity of a braided wire and preventing the grounding wire from falling away, and ring members that are suitably employed in the processing method.

Means for Solving Problems

The above object of the invention is realized by following configurations.

(1) A braided wire processing method of connecting a grounding wire to a braided wire of a shielded electric wire by using a plurality of ring members having different diameters, the method comprising a first process of enabling an exterior side of the braided wire, which is exposed by stripping a terminal portion of the shielded electric wire, to pass through a conductive first ring member from an electric wire axis direction; a second process of inserting a conductor of the grounding wire into a cutout portion, which is formed at the first ring member and becomes a cutout in the electric wire axis direction, and extending the conductor in the electric wire axis direction; a third process of folding back the braided wire at an end portion of the first ring member to thus cover an outer circumference portion and the cutout portion of the first ring member and the conductor of the grounding wire, and a fourth process of enabling an exterior side of the folding back portion, which is formed by folding back the braided wire, to pass through a second ring member from the electric wire axis direction and compressing the first ring member in a circumferential direction thereof as the second ring member passes thereupon, thereby contracting a gap of the cutout portion.

According to the above (1) configuration, since the plurality of ring members is used which enables the contact position of the conductor in the grounding wire and the retention position thereof as regards the braided wire to be different, it is possible to secure the sufficient stability as regards the contact with the conductor of the grounding wire and the retentivity of the braided wire. Also, since the conductor of the grounding wire is inserted into the cutout portion of the first ring member and the inserted part is covered with the braided wire folding back portion, it is possible to prevent the grounding wire from falling away when the second ring member passes thereupon. Also, as the second ring member 13 passed thereupon, the conductor of the grounding wire is clasped. Therefore, it is possible to prevent the grounding wire from falling away while the second ring member is being passed thereupon.

(2) A plurality of ring members having different diameters and being used to connect a grounding wire to a braided wire of a shielded electric wire, the ring members comprising a conductive first ring member through which an exterior side of the braided wire, which is exposed by stripping a terminal portion of the shielded electric wire, passes from an electric wire axis direction, and a second ring member that has a diameter larger than that of the first ring member and through which the first ring member, which is covered by folding back the braided wire, passes from the electric wire axis direction, wherein the first ring member is formed with a cutout portion that is formed by cutting a part of the first ring member in the electric wire axis direction and in which a conductor of the grounding wire is inserted and extends in the electric wire axis direction, and wherein the second ring member is configured to have a shape that contracts a gap of the cutout portion as the first ring member passes through the second ring member.

According to the above (2) configuration, it is possible to enable the contact position of the conductor in the grounding wire and the retention position thereof as regards the braided wire to be different. Also, it is possible to prevent the grounding wire from falling away when the second ring member passes thereupon. Therefore, it is possible to provide the ring members that are suitably employed in the braided wire processing method.

(3) Regarding the ring members of the above (2) configuration, the cutout portion or an adjacency thereof is formed with a pressure receiving protrusion that protrudes in a direction orthogonal to the electric wire axis direction and is pressed in a direction of contracting the gap of the cutout portion by the second ring member.

According to the above (3) configuration, it is possible to increase the clasping strength of the conductor of the grounding wire. Therefore, it is possible to improve the stability as regards the contact.

(4) Regarding the ring members of the above (2) or (3) configuration, an end portion outer peripheral edge becoming an electric wire terminal-side of the first ring member and an end portion inner peripheral edge becoming an insertion beginning-side of the second ring member are respectively formed with tapers.

According to the above (4) configuration, it is possible to smoothly perform the insertion into the second ring member and to prevent the braided wire from being cut during the insertion.

According to the above (1) or (2) configuration, the first ring member having conductivity is formed with the cutout portion in the electric wire axis direction and the conductor of the grounding wire is clasped by the cutout portion to thus make electrical connection. Also, as the second ring member passes thereupon, the braided wire folding back portion is compressed to the outer circumference portion of the first ring member to thus make electrical connection. Also, the conductor of the grounding wire is inserted into the cutout portion of the first ring member and is extended in the cutout portion in the electric wire axis direction, thereby preventing the grounding wire from being caught upon the insertion into the second ring member. Also, as the second ring member passes thereupon, the second ring member compresses the first ring member to thus contract the gap of the cutout portion, thereby preventing the grounding wire from falling away.

In the above (3) configuration, the cutout portion or an adjacency thereof is formed with the pressure receiving protrusion, so that it is possible to increase the clasping strength of the conductor of the grounding wire. Also, in the above (4) configuration, the first ring member and the second ring member are respectively formed with the tapers, so that it is possible to smoothly perform the insertion into the second ring member and to prevent the braided wire from being cut.

BRIEF DESCRIPTION OF DRAWINGS

FIGS. 2A to 2C illustrate operations relating to third to fifth processes of the braided wire processing method according to an illustrative embodiment of the invention.

EMBODIMENTS OF INVENTION

Figures 1A, 1B, 1C:
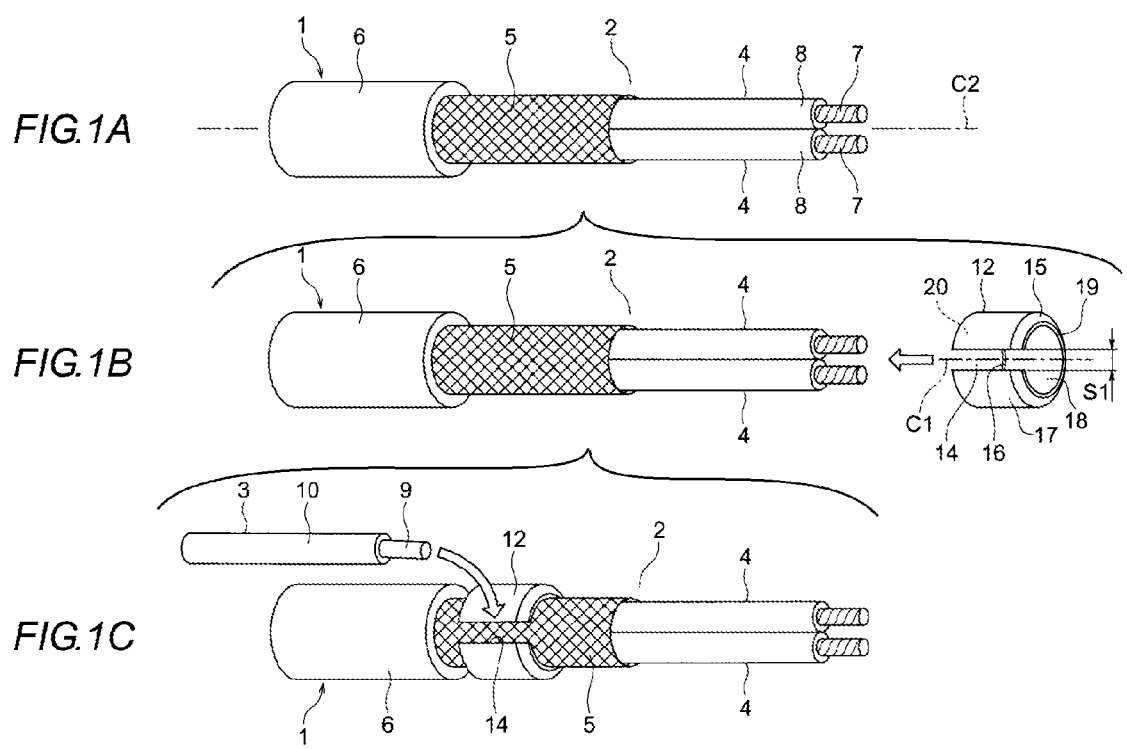
FIGS. 1A to 1C illustrate operations relating to first and second processes of a braided wire processing method according to an illustrative embodiment of the invention.

Hereinafter, a braided wire processing method and ring members according to an illustrative embodiment of the invention will be described with reference to the drawings.

As shown in FIGS. 1A to 2C, a shielded electric wire 1 is configured so that a connector is mounted to extend over a grounding wire 3 and a terminal portion 2 with the grounding wire 3 being electrically connected to the terminal portion 2. First, configurations and structures of the shielded electric wire 1 and the grounding wire 3 will be described. Then, a braided wire processing method according to this illustrative embodiment will be described and the connector will be lastly described.

In this illustrative embodiment, the well-known shielded electric wire is used as the shielded electric wire 1. Although not particularly limited, the shielded electric wire 1 has two signal wires 4, a braided wire 5 provided on exterior sides of the two signal wires 4 and an insulator 6 provided on an exterior side of the braided wire 5. Also, an intervention or press and winding and internal sheath may be formed between the two signal wires 4 and the braided wire 5.

The signal wires 4 are the same. The signal wire has a conductor 7 and an insulator 8 covering the conductor 7. The signal wires 4 are provided as insulated wires for signal transmission. The braided wire 5 is provided as a part exhibiting an electronic shield function. The braided wire 5 is formed by braiding very thin metal wires having conductivity. The insulator 6 is provided by extruding a synthetic resin material having insulation onto the braided wire 5. The insulator 6 is provided as a sheath.

The grounding wire 3 has the same configuration as the signal line 4 and is configured to have a conductor 9 and an insulator 10 covering the conductor 9. The grounding wire 3 has a length that is adjusted depending on a distance from the terminal portion 2 to the connector.

The braided wire processing method of this illustrative embodiment is a processing method of connecting the grounding wire 3 to the braided wire 5 of the shielded electric wire 1, in which a ring member 11 of this illustrative embodiment is used when connecting the grounding wire 3 to the braided wire 5. The ring member 11 consists of a first ring member 12 shown in FIGS. 1B and 1C and a second ring member 13 shown in FIGS. 2B and 2C.

In FIGS. 1B and 1C, FIGS. 3A and 3B and FIG. 4, the first ring member 12 is made of a metal material having conductivity and elasticity and has a substantial ring shape (or substantial cylinder shape), as shown in FIGS. 1B and 1C. The first ring member 12 having the above shape is formed with a cutout portion 14. Also, the first ring member is formed with tapers 15, 16. Regarding the first ring member 12, a reference numeral 17 indicates an outer circumference portion, a reference numeral 18 indicates an interior circumference portion and reference numerals 19, 20 indicate end portions. The first ring member 12 is formed so that a diameter of the interior circumference portion 18 matches an outer diameter of the braided wire 5.

The end portion 19 is an end portion of an electric wire terminal-side and an outer peripheral edge thereof is formed with the taper 15. Also, the end portion 20 is an end portion of the insulator 6-side and an inner peripheral edge thereof is formed with the taper 16.

The cutout portion 14 is formed by cutting a part of the first ring member in a ring center axis C1 (which coincides with an electric wire axis C2 that will be described later) direction. Also, the cutout portion 14 is formed by straightly cutting a part of the first ring member from the end portion 19 to the end portion 20. A gap S1 of the cutout portion 14 has a size that enables the conductor 9 of the grounding wire 3 to be inserted therein. Since the first ring member 12 has the cutout portion 14, the first ring member has a substantial ring shape (or substantial cylinder shape) having a C-shaped section.

Figure 3A:
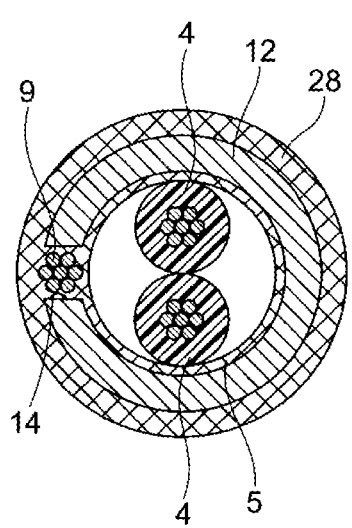
FIG. 3A is a sectional view taken along a line A-A of FIG. 2B
Figure 3B:
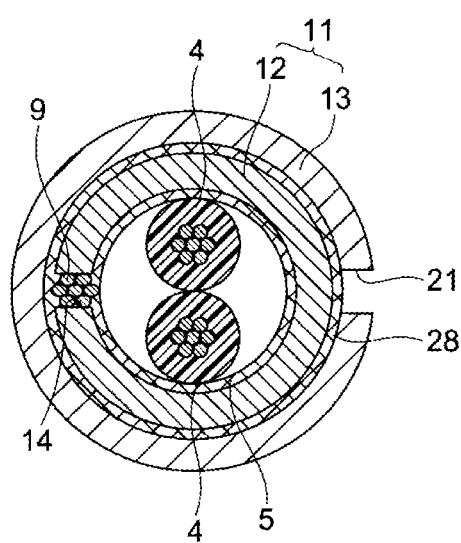
FIG. 3B is a sectional view taken along a line B-B of FIG. 2C.
Figure 4:
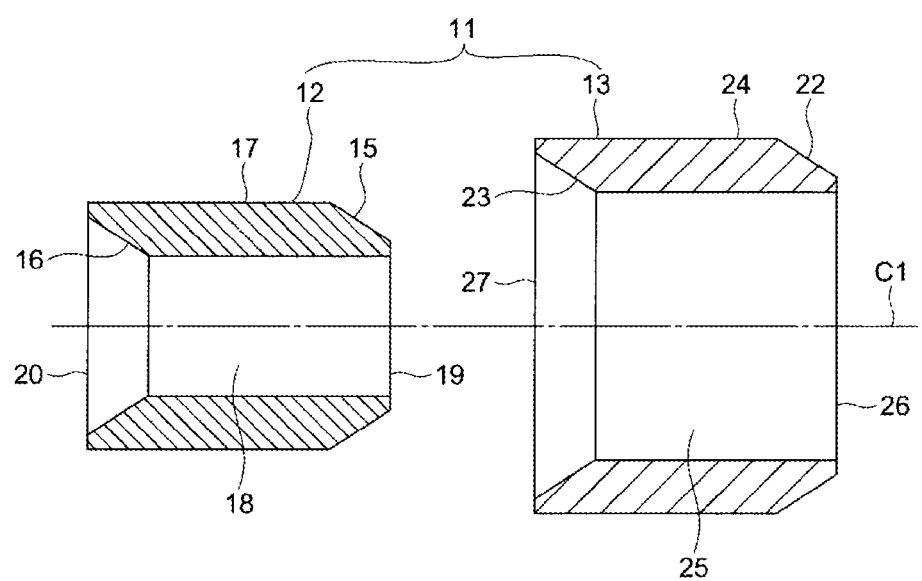
FIG. 4 is a sectional view of ring members according to an illustrative embodiment of the invention.

In FIGS. 2B and 2C to FIG. 4, the second ring member 13 is made of a metal material or synthetic resin material having elasticity and has a substantial ring shape (or substantial cylinder shape), as shown in FIGS. 2B and 2C. As shown in FIGS. 3B and 4, the second ring member 13 has a diameter larger than that of the first ring member 12. The second ring member 13 is more rigid than the first ring member 12 and is configured to compress the first ring member 12 in a circumferential direction thereof.

The second ring member 13 is formed with a cutout portion 21. Also, the second ring member is formed with tapers 22, 23. Regarding the second ring member 13, a reference numeral 24 indicates an outer circumference portion, a reference numeral 25 indicates an interior circumference portion and reference numerals 26, 27 indicate end portions. The second ring member 13 is formed so that a diameter of the interior circumference portion 25 matches the outer circumference portion 17 of the first ring member 12.

The end portion 26 is an end portion of an electric wire terminal-side and an outer peripheral edge thereof is formed with the taper 22. Also, the end portion 27 is an end portion of the insulator 6-side (an end portion of an insertion beginning-side) and an inner peripheral edge thereof is formed with the taper 23. The taper 23 is formed to correspond to the taper 15 of the first ring member 12.

The cutout portion 21 is formed by cutting a part of the second ring member in the ring center axis C1 (which coincides with the electric wire axis C2 that will be described later) direction. Also, the cutout portion 21 is formed by straightly cutting a part of the second ring member from the end portion 26 to the end portion 27. A gap S2 of the cutout portion 21 is not particularly limited insomuch as it has a sufficient size that enables insertion and compression of the first ring member 12. Like the first ring member 12, the second ring member 13 has a substantial ring shape (or substantial cylinder shape) having a C-shaped section.

Based on the above configurations and structures, the braided wire processing method is described with reference to FIGS. 1A to 3B. The braided wire processing method passes through first to fifth processes sequentially.

<First Process>

In FIG. 1A, an operation is carried out wherein the insulator 6 of the terminal portion 2 of the shielded electric wire 1 is stripped from the electric wire terminal by a predetermined length. Then, an operation is carried out wherein the braided wire 5 exposed by the stripping of the insulator 6 is cut from the electric wire terminal by a predetermined length. Subsequently, an operation is carried out wherein the insulators 8 of the two signal wires 4 exposed by the cutting of the braided wire 5 are stripped from the electric wire terminal by a predetermined length, so that the conductors 7 are exposed.

In FIG. 1B, an operation is carried out wherein the first ring member 12 is prepared, the ring center axis C1 is matched with the electric wire axis C2 of the shielded electric wire 1 and the exterior side of the braided wire 5 passes through the first ring member 12 from the electric wire axis C2 direction (refer to an arrow). Since the first ring member 12 has the taper 16 at the inner peripheral edge of the end portion thereof, it is possible to enable the exterior side of the braided wire 5 to be smoothly passed through the first ring member 12. When the insertion into the first ring member 12 is completed, a state as shown in FIG. 1C is made.

<Second Process>

In FIG. 1C, an operation is carried out wherein the grounding wire 3 having the conductor 9 exposed is prepared. Then, an operation is carried out wherein the conductor 9 of the grounding wire 3 is inserted (refer to an arrow) into the cutout portion 14 of the first ring member 12 and the conductor 9 is then extended in the electric wire axis C2 direction. When the insertion of the conductor 9 and the like are completed, a state as shown in FIG. 2A is made.

<Third Process>

In FIG. 2A, an operation is carried out wherein the braided wire 5 is folded back at the end portion 19 of the first ring member 12 to thus form a braided wire folding back portion 28 and the outer circumference portion 17 and the cutout portion 14 of the first ring member 12 and the conductor 9 of the grounding wire 3 are covered by the braided wire folding back portion 28. When this operation is completed, a state as shown in FIGS. 2B and 3A is made.

<Fourth Process>

In FIG. 2B, an operation is carried out wherein the second ring member 13 is prepared, the ring center axis C1 is matched with the electric wire axis C2 of the shielded electric wire 1 and an exterior side of the braided wire folding back portion 28 passes through the second ring member 13 from the electric wire axis C2 direction (refer to an arrow). Since the second ring member 13 has the taper 23 at the inner peripheral edge of the end portion thereof, it is possible to enable the exterior side of the braided wire folding back portion 28 to be smoothly passed through the second ring member. Also, since the first ring member 12 has the taper 15 at the outer peripheral edge of the end portion thereof in correspondence to the taper 23, the problem that the braided wire 5 is cut does not occur when performing the insertion operation.

The operation of inserting the second ring member 13 is carried out so that the cutout portion 21 is positioned at the opposite side to the cutout portion 14 of the first ring member 12. In the fourth process, as the second ring member 13 passes thereupon, the second ring member 13 compresses the first ring member 12 in the circumferential direction thereof. Thereby, the gap S1 of the cutout portion 14 of the first ring member 12 is contracted and the conductor 9 that is inserted therein is clasped. When the conductor 9 is clasped, it is electrically connected to the first ring member 12 (refer to FIG. 3B).

When the insertion of the second ring member 13 is completed, a state as shown in FIGS. 2C and 3B is made. The second ring member 13 is retained to compress the braided wire folding back portion 28 to the outer circumference portion 17 of the first ring member 12. The braided wire folding back portion 28 and the first ring member 12 are electrically connected. The conductor 9 is electrically connected to the braided wire folding back portion 28 via the first ring member 12.

<Fifth Process>

In FIG. 2C, an operation is carried out wherein a tape (not shown) is wound onto a part shown with a circle 29 in the braided wire processing. Then, crimping terminals (not shown) are respectively crimped to the terminal (part shown with the circle 30) of the grounding wire 3 and the conductors 7 (part shown with a circle 31) of the signal wires 4, which is then accommodated in a connector housing 40 to thus form a connector. When this operation is completed, the connector is mounted to extend over the terminal portion 2 of the shielded electric wire 1 and the grounding wire 3.

As described with reference to FIGS. 1A to 4, according to this illustrative embodiment, since the ring member 11 (the first ring member 12 and the second ring member 13) is used which enables the contact position of the conductor 9 in the grounding wire 3 and the retention position thereof as regards the braided wire 5 to be different, it is possible to secure the sufficient stability as regards the contact with the conductor 9 of the grounding wire 3 and the retentivity of the braided wire 5.

Also, according to this illustrative embodiment, since the conductor 9 of the grounding wire 9 is inserted into the cutout portion 14 of the first ring member 12 and the inserted part is covered with the braided wire folding back portion 28, it is possible to prevent the grounding wire 3 from falling away when the second ring member 13 passes thereupon.

Also, according to this illustrative embodiment, as the second ring member 13 passes thereupon, the conductor 9 of the grounding wire 3 is clasped by the cutout portion 9. Therefore, it is possible to prevent the grounding wire 3 from falling away while the second ring member 13 is being passed thereupon.

In the below, the clasping of the conductor 9 by the cutout portion 14 is supplementarily described.

Figure 5A:
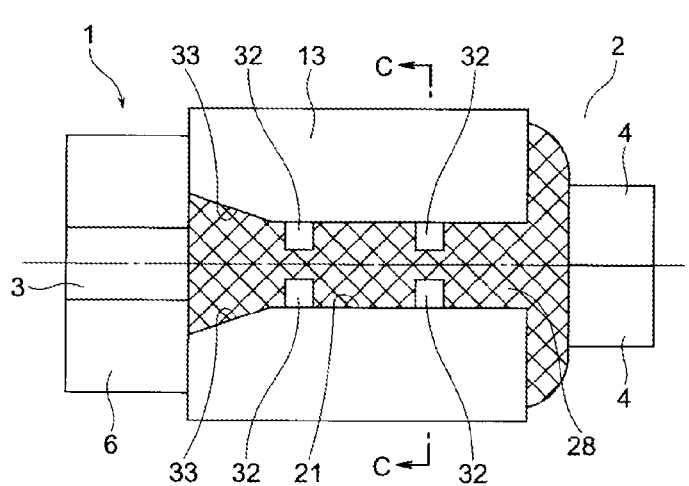
FIG. 5A is a side view of the ring members according to an illustrative embodiment of the invention and FIG. 5B is a sectional view taken along a line C-C of FIG. 5A.
Figure 5B:
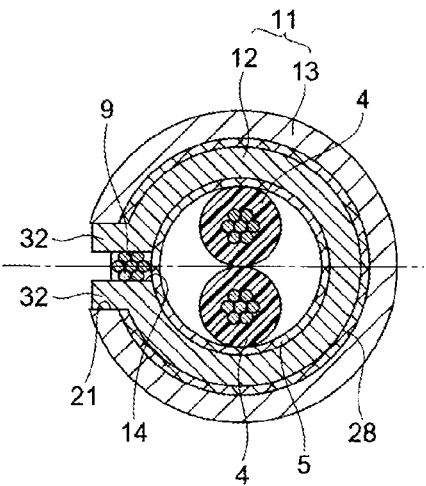
Figure 6A:
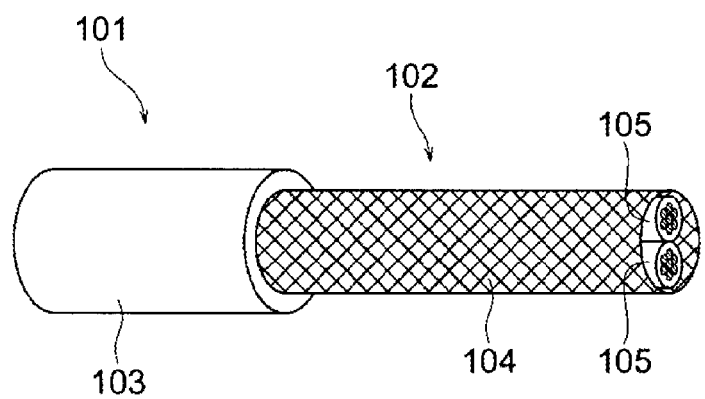
FIGS. 6A to 6C illustrate operations of a braided wire processing method according to the conventional example.
Figure 6B:
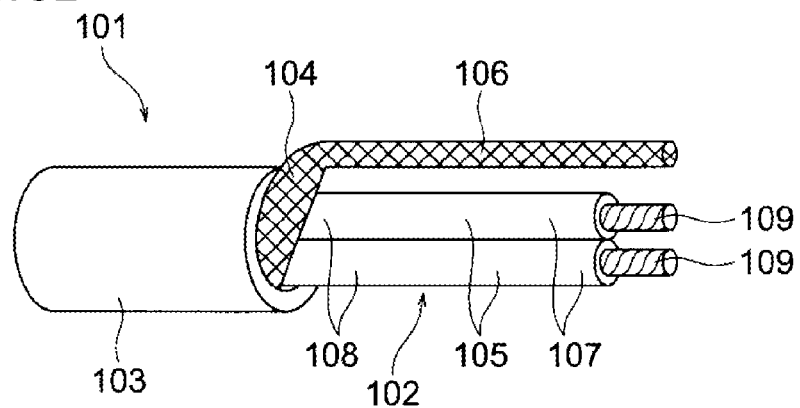
Figure 6C:
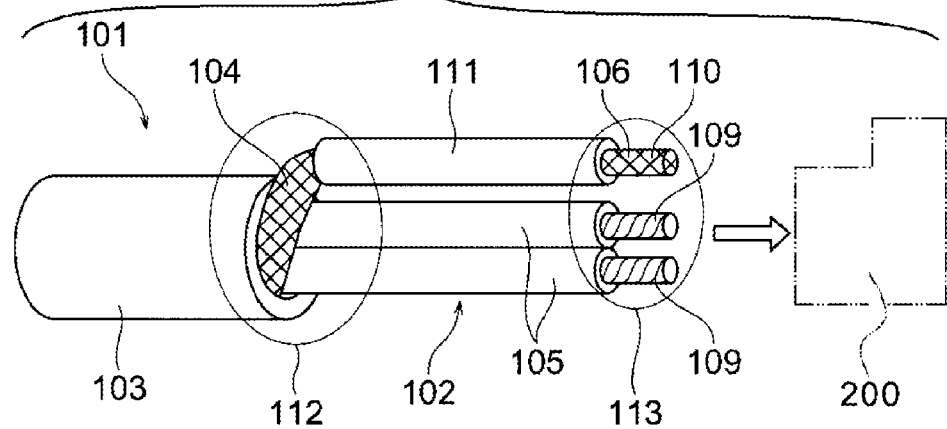
Figure 7A:
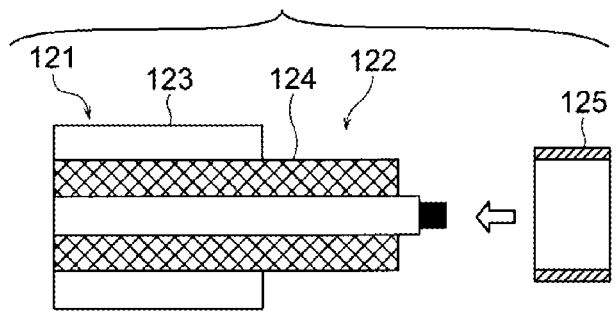
FIGS. 7A to 7D illustrate operations of a braided wire processing method according to another conventional example.
Figure 7B:
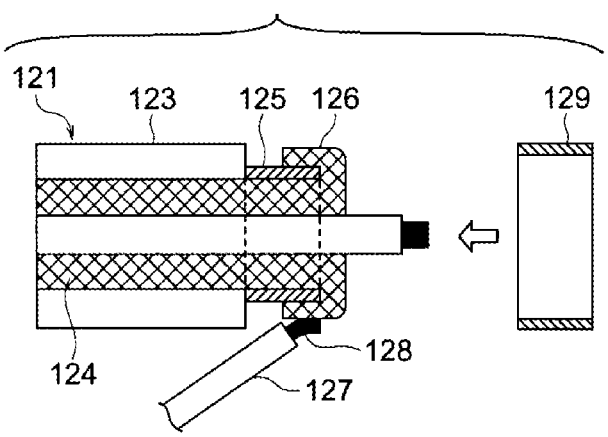
Figure 7C:
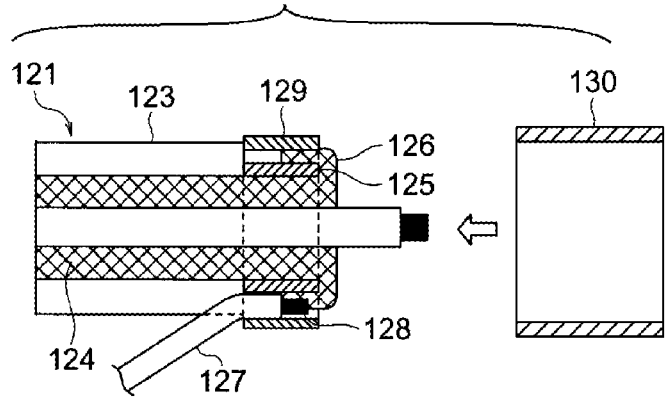
Figure 7D:
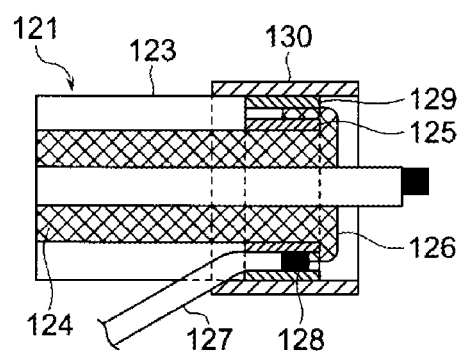

In FIGS. 5A and 5B, the cutout portion 14 of the first ring member 12 is formed with two pairs of pressure receiving protrusions 32 that protrude in a direction orthogonal to the electric wire axis C2 direction. The pressure receiving protrusion 32 has a projection shape having a rectangular section (the shown shape is simply exemplary). Also, the pressure receiving protrusion 32 has a shape that can easily protrude from a stitch of the braided wire folding back portion 28.

The second ring member 13 is configured to compress the pressure receiving protrusions 32 in a direction of contracting the gap of the cutout portion 14 by the cutout portion 21. The cutout portion 21 of the second ring member 13 is formed with a pair of guide tapers 33 for guiding the pressure receiving protrusions 32 so that the guide tapers face each other.

According to the above structure, it is possible to increase the clasping strength of the conductor 9. Therefore, it is possible to secure the effect of improving the stability as regards the contact.

Although the invention has been specifically described with reference to the specific illustrative embodiments, a variety of modifications can be made without departing from the gist of the invention.

This application is based on Japanese Patent Application No. 2010-128466 filed on Jun. 4, 2010, the disclosures of which are incorporated herein by reference.

INDUSTRIAL APPLICABILITY

According to the braided wire processing method and the ring members of the invention, it is possible to provide the braided wire processing method capable of ensuring sufficient stability as regards contact with the conductor in the grounding wire and the retentivity of the braided wire and preventing the grounding wire from falling away, and the ring members that are suitably employed in the processing method.

DESCRIPTION OF REFERENCE NUMERALS

1: Shielded electric wire
2: Terminal Portion
3: Grounding Wire
4: Signal Wire
5: Braided Wire
6: Insulator
7, 9: Conductor
8, 10: Insulator
11: Ring Member
12: First Ring Member
13: Second Ring Member 14: Cutout Portion
15, 16, 22, 23: Taper
17, 24: Outer circumference Portion
18, 25: Interior Circumference Portion
19, 20, 26, 27: End Portion
29: Braided Wire Folding Back Portion
32: Pressure Receiving Protrusion
33: Guide Taper
40: Connector Housing
C1: Ring Center Axis
C2: Electric Wire Axis
S1, S2: Gap

The invention claimed is:

1. A braided wire processing method of connecting a grounding wire to a braided wire of a shielded electric wire by using a plurality of ring members having different diameters, the method comprising:
   a first process of enabling an exterior side of the braided wire, which is exposed by stripping a terminal portion of the shielded electric wire, to pass through a conductive first ring member from an electric wire axis direction;
   a second process of inserting a conductor of the grounding wire into a cutout portion, which is formed at the first ring member and becomes a cutout in the electric wire axis direction, and extending the conductor in the electric wire axis direction;
   a third process of folding back the braided wire at an end portion of the first ring member to thus cover an outer circumference portion and the cutout portion of the first ring member and the conductor of the grounding wire, and
   a fourth process of enabling an exterior side of the folding back portion, which is formed by folding back the braided wire, to pass through a second ring member from the electric wire axis direction and compressing the first ring member in a circumferential direction thereof as the second ring member passes thereupon, thereby contracting a gap of the cutout portion.

2. A plurality of ring members having different diameters and being used to connect a grounding wire to a braided wire of a shielded electric wire, comprising:
   a conductive first ring member through which an exterior side of the braided wire, which is exposed by stripping a terminal portion of the shielded electric wire, passes from an electric wire axis direction, and
   a second ring member that has a diameter larger than that of the first ring member and through which the first ring member, which is covered by folding back the braided wire, passes from the electric wire axis direction,
   wherein the first ring member is formed with a cutout portion that is formed by cutting a part of the first ring member in the electric wire axis direction and in which a conductor of the grounding wire is inserted and extends in the electric wire axis direction, and
   wherein the second ring member is configured to have a shape that contracts a gap of the cutout portion as the first ring member passes through the second ring member.

3. The ring members according to claim 2, wherein the cutout portion or an adjacency thereof is formed with a pressure receiving protrusion that protrudes in a direction orthogonal to the electric wire axis direction and is pressed in a direction of contracting the gap of the cutout portion by the second ring member.

4. The ring members according to claim 2, wherein an end portion outer peripheral edge becoming an electric wire terminal-side of the first ring member and an end portion inner peripheral edge becoming an insertion beginning-side of the second ring member are respectively formed with tapers.

* * * * *